United States Patent [19]

Reck et al.

[11] Patent Number: 5,143,969
[45] Date of Patent: Sep. 1, 1992

[54] HEAT-CURABLE BISMALEIMIDE MOLDING COMPOSITIONS

[75] Inventors: Bernd Reck, Beindersheim; Rita A. Laschober; Dale Gerth, both of Ludwigshafen, all of Fed. Rep. of Germany; Jack D. Boyd, Westminster, Calif.

[73] Assignee: BASF Aktiengesellschaft, Ludwigshafen, Fed. Rep. of Germany

[21] Appl. No.: 719,440

[22] Filed: Jun. 24, 1991

[51] Int. Cl.$^5$ .......................... C08L 37/00; C08F 22/40
[52] U.S. Cl. .................................... 524/548; 525/182; 526/262
[58] Field of Search .................. 524/548; 525/182; 526/262

[56] References Cited

U.S. PATENT DOCUMENTS 5,003,017  3/1991  Eisenbarth et al. ................. 526/262
5,077,363  12/1991  Eisenbarth et al. ................. 526/262

Primary Examiner—Joseph L. Schofer
Assistant Examiner—Alex H. Walker
Attorney, Agent, or Firm—William G. Conger

[57] ABSTRACT

Heat-curable bismaleimide resins contain a bismaleimide, an aromatic dialkenyl compound as comonomer and also from 1 to 40% by weight of a monoalkenyl compound, preferably 2-hydroxy-3-allylbiphenyl, as reactive diluent.

2 Claims, No Drawings

HEAT-CURABLE BISMALEIMIDE MOLDING COMPOSITIONS

The present invention relates to heat-curable resins based on bismaleimides.

Bismaleimide resins which contain aromatic diamines as comonomers have in the cured state excellent mechanical and electrical properties even at above 200° C., but the corresponding prepolymeric resins have relatively high softening temperatures together with high melt viscosities; molding compounds or prepregs produced with these prepolymeric resins do not possess the tack frequently desired by the user.

Lower softening temperatures and viscosities of the prepolymeric resins are obtained by using bicyclic alkenyl phenols, as described for example in DE-A-26 27 045 (U.S. Pat. No. 4,100,140), EP-A-14 816 (U.S. Pat. No. 4,288,583) and DE-B-28 18 091 (U.S. Pat. No. 4,173,592). In the last-mentioned reference it is also mentioned that vinyl and allyl compounds can be mixed in to reduce the viscosity of the molding composition and to confer flexibility on the cured resins.

The disadvantage of the known mixtures, including those containing the preferred diallylbisphenol A, is their comparatively low tack, which is inadequate for processing prepregs into high performance composite materials. Moreover, the processing viscosity of the resins is too high for many applications. If, as recommended in DE-A-28 18 091, an attempt is made to reduce the viscosity with certain monomers, for example styrene, allylphenol or allyloxybenzene, processing problems result as a consequence of the high volatility of these occasionally harmful substances. The addition of other monomers, such as diallyl phthalate, impairs the mechanical and/or thermal properties of the cured pieces.

It is an object of the present invention to modify molding compositions of bismaleimides and dialkenyl comonomers in such a way as to improve their tack and reduce their viscosity without having to add volatile substances and without impairing the properties of the moldings produced therefrom.

We have found that this object is achieved by including in the molding compositions mentioned from 1 to 40, in particular from 5 to 25, % by weight, based on the total molding composition, of a monoalkenyl compound of the general formula

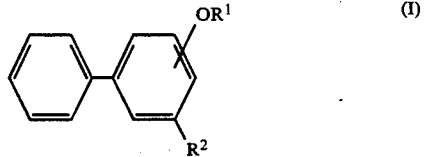

where either
a) $R^1$ is allyl or propenyl and $R^2$ is hydrogen, or
b) $R^1$ is hydrogen, $R^2$ is allyl or propenyl and the OH group is ortho to $R^2$.

These substances on the one hand have relatively low melting points, which reduces the viscosity of the bismaleimide resin, and on the other have comparatively high boiling points, so that their volatility is low at processing temperatures.

The bismaleimide resins contain a bismaleimide A of the general formula

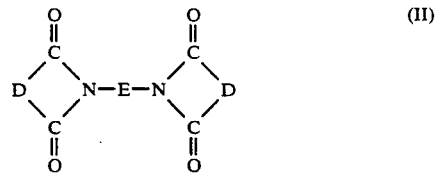

where D is a substituted or unsubstituted carbon double bond and E is a divalent radical of at least two carbon atoms. Bismaleimides are known, for example from DE-A-2,040,094, DE-A-2 719 903 and DE-A-2 247 058. Besides bismaleimides it is in principle also possible to use polymaleimides and mixtures of different bismaleimides. Preferred bismaleimides are 4,4'-bismaleimidodiphenylmethane, 4,4'-bismaleimidodiphenyl ether, 3,3'-bismaleimidodiphenyl sulfone, 1,3-bismaleimidobenzene, 2,4-bismaleimidotoluene, 1,6-bismaleimidohexane and 2,2,4-trimethyl-1,6-bismaleimidohexane. Bismaleimide resins contain preferably from 40 to 80% by weight, based on A +B+C, of bismaleimide A.

Dialkenyl compounds B are bicyclic aromatic compounds having two alkenyl substituents of from 2 to 6 carbon atoms, the alkenyl group being bonded to the benzene ring directly or via an oxygen atom. Preference is given to allyl and propenyl compounds, in particular those which have not only an OH group but also an alkenyl group on the same benzene ring. This includes allylphenols, e.g., o,o'-diallylbisphenol A; similarly suitable allylphenols based for example on bisphenol F or corresponding novolaks, bisphenol S, hydroquinone or dicyclopentadiene as described in EP-A-276 733. Other suitable alkenyl compounds are, for example, 2,6-di(2-propenylphenoxy)pyridine, 4,4'-di(2-propenylphenoxy)benzophenone, 4,4'-bis(2-propenylphenoxy)diphenyl sulphone and other oligomers as described in EP-A-230 741. The bismaleimide resins preferably contain from 20 to 60% by weight, based on A+B+C, of dialkenyl compound B.

The monoalkenyl compounds C added according to the present invention are known per se; they are described for example in Agr.Biol.Chem. (Tokyo) 32, (1968), 1162, as substances having a fungistatic effect.

To prepare the compounds, the starting material is 2- or 4-hydroxybiphenyl, which is reacted with allyl chloride to give the corresponding allyl ether ($R^1$=allyl and $R^2$=H in the general formula). This allyl ether can be converted by the Claissen rearrangement into 2- or 4-hydroxy-3-allylbiphenyl ($R^1$=H and $R^2$=allyl). The latter are preferred, since in this case the solubility of the bismaleimides is best. Of particularly high suitability is 2-hydroxy-3-allylbiphenyl, since it is liquid and of low viscosity at room temperature. The corresponding propenyl compounds can be prepared from the allyl compounds by thermal, base-catalyzed rearrangement. The monoalkenyl compounds C can copolymerize in the preparation or curing of the bismaleimide resins of the present invention; they thus act as reactive diluents in the system. They are present in the resins of the present invention in amounts of from 1 to 40, preferably from 2 to 20, % by weight, based on A+B+C.

To prepare the bismaleimide resins of the present invention, the starting material are mixed in a conventional manner and heated to 70°-190° C., and a prepolymer forms. Depending on the progress of the prepolymerization,. a melt of relatively low viscosity is obtained or a glassy solid, which, depending on the intended use, is ground or dissolved in a solvent. The resins can also be prepared in a solvent.

Depending on the intended use, it can be advantageous to add further components to the resins of the present invention. Possible additional components are for example amines, preferably aromatic diamines (e.g. 4,4'-diaminodiphenylmethane) and aminophenols, which can likewise undergo an addition reaction with the maleimide double bonds. It is also possible to use prepolymers, prepared for example from a bisimide and an amine.

For certain applications it can be advisable to use small amounts of suitable vinyl monomers, for example styrene, α-methylstyrene, divinylbenzene, acrylic or methacrylic esters, diallyl phthalate, 3,3'-diallylbisphenol A, triallyl isocyanurate, triallyl cyanurate or binylpyrrolidone. However, the amount thereof should be less than 10, preferably less than 2, % by weight, based on the mixture.

The mixtures of the present invention may further contain inhibitors. Suitable inhibitors are hydroquinone, benzoquinone and phenothiazine. The amount of inhibitor used should be approximately within the range from 0.05 to 1.5% by weight.

The mixtures of the present invention may contain further additives customary in the art of curable plastics, such as fillers, palsticizers, pigments, dyes, demolding agents and flame retardants. As fillers it is also possible to use glass and carbon fibers, graphite powder, mica, quartz powder, kaolin or metal powder up to an amount of 80% by weight, based on the mixture.

The mixtures of the present invention are suitable for use as impregnating, casting and laminating resins or as molding compositions (filled or unfilled).

If they are used to produce high performance composite materials, then the impregnating of glass, carbon or aramid fibers to form unidirectional or woven prepregs can take place either from the melt at from 50° to 150° C. or from solution. Suitable solvents are halogenated hydrocarbons, e.g. dichloromethane, ketones, e.g. acetone or methyl ethyl ketone, glycol esters, toluene, dimethylformamide, N-methylpyrrolidone or mixtures thereof. A plurality of layers of such prepregs are then draped on top of one another and pressed together. Here the good tack of the bismaleimide resins of the present invention is of advantage.

In the reaction transfer molding process, preformed fiber structures are placed into a two-part mold, then the mold is closed and the resin melt is injected into the mold and cured therein. Here the low viscosity of the bismaleimide resins of the present invention is of great advantage.

In the Examples, parts and percentages are by weight.

EXAMPLE a) Preparation of 2-hydroxy-3-allylbiphenyl 454 g of KOH in the form of a 50% strength aqueous solution were added to a solution of 1275 g of 2-hydroxybiphenyl in 4000 ml of acetone and the mixture was stirred at 60° C. for 4 h. 795 ml of allyl chloride were added dropwise. After 12 h of stirring at 60° C. a further 162 ml of allyl chloride were added dropwise, and the mixture was stirred for a further 12 h at 60° C. The acetone was distilled off, 2000 ml of water were added, and the reaction product was extracted with 2000 ml of methyl ethyl ketone. The organic phase was washed twice wit 2000 ml of water each time and the solvent was removed under reduced pressure.

Yield of 2-allyloxybiphenyl: 1540 g.
Purity: 95%.
Viscosity at 25° C.: 17 mPas (Rheomat viscometer)
Phenolic OH: 0.02%.

To carry out the Claissen rearrangement, 500 g of 2-allyloxybiphenyl were heated at 195° C. in a glass flask under reduced pressure (600 mbar) for 7 h.

Yield of 2-hydroxy-3-allylbiphenyl: 497 g.
Purity: 86% (HPLC).
Viscosity at 25° C.: 21 mPas (Rheomat viscometer).
Hydrogenation iodine number: 118.
Phenolic OH: 7.8%.

b) Preparation and curing of a bismaleimide resin

In a stirred vessel, 600 g of o,o'-diallylbisphenol A, 600 g of 4,4'-bismaleimidodiphenylmethane, 600 g of 2,4-bismaleimidotoluene and 200 g of 2-hydroxy-3-allylbiphenyl were mixed at 140° C. until a homogeneous melt had formed.

To determine the mechanical and thermal properties of the unreinforced molding material, some of the resin was poured between molding surfaces made of metal and cured at 160° C. for 2 h, at 180° C. for 4 h and at 240° C. for 6 h. Specimens produced therefrom gave the values indicated in the table.

b₂) For comparison, the same method was used to prepare a resin which contained no hydroxyallylbiphenyl but instead 40 instead of 30 parts of diallylbisphenol A.

TABLE

|  |  | $b_1$ | $b_2$ |
| --- | --- | --- | --- |
| Uncured pure resin: |  |  |  |
| Viscosity at 75° C. | [mPas] | 2100 | >4000 |
| at 100° C. (plate-cone viscometer) | [mPas] |  |  |
| Glass transition temperature $T_{g0}$ (DSC measurement) | [°C.] |  |  |
| Cured pure resin: |  |  |  |
| $K_{IC}$ value | [MPam$^{1/2}$] | 0.90 | 0.84 |
| $G_{IC}$ value (ASTM E399) | [J/m$^2$] | 170 | 143 |
| Softening temperature $T_s$ dry (tangent intersection from DMA measurement) | [°C.] | 273 | 276 |
| Modulus of elasticity (DIN 53457) | [MPa] | 4490 | 4480 |

The resin of the present invention has a significantly lower viscosity at 100° C. than the comparative resin; the glass transition temperature of 8° C. indicates a sufficiently good tack at room temperature. The moldings produced by curing hardly differ in their mechanical and thermal properties.

c) Production of composition materials

To produce unidirectional prepregs based on the carbon fiber IM7 (from Hercules) the bismaleimide resin was first applied at 70° C. to a continuously moving prepreg paper to form a thin film (about 70 g/m²). Then the fiber tape having a sheet weight of 134 g/m² was placed under pressure into the resin film at about 85° C. and completely impregnated.

To produce reinforced high performance composite materials, laminates were produced by superposing a plurality of prepreg layers (in accordance with the requirements of the test specimen standard) and cured in accordance with the above-specified curing cycle.

Laminate properties (resin content 34%)

| | | |
|---|---|---|
| $G_{IC}$ value (in accordance with NASA RP 1092) | 272 | J/m² |
| $G_{IIC}$ value (in accordance with NASA RP 1092) | 533 | J/m² |
| Bending strength 23° C. dry | 2970 | MPa |
| (DIN 29971) 180° C. dry | 2150 | MPa |
| 180° C. moist (10 d/70° H₂O) | 1660 | MPa |

We claim:

1. A heat-curable bismaleimide resin, containing
   A. a bismaleimide,
   B. an aromatic dialkenyl compound,
   C. from 1 to 40% by weight, based on A+B+C, of a monoalkenyl compound, wherein the monoalkenyl compound C has the general formula

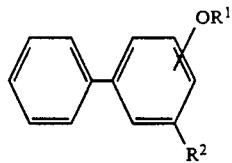

(I)

where either
   a) $R^1$ is allyl or propenyl and $R^2$ is hydrogen, or
   b) $R^1$ is hydrogen, $R^2$ is allyl or propenyl and the OH group is ortho to $R^2$.

2. High performance composite materials, containing the bismaleinimide resin of claim 1 together with oriented reinforcing fibers.

* * * * *